(12) United States Patent
Gangarapu et al.

(10) Patent No.: US 7,831,590 B2
(45) Date of Patent: Nov. 9, 2010

(54) TECHNIQUES FOR PARTITIONING INDEXES

(75) Inventors: Amaranatha Reddy Gangarapu, Hyderabad (IN); Louis Burger, Escondido, CA (US); Frank Roderic Vandervort, Ramona, CA (US)

(73) Assignee: Teradata US, Inc., Miamisburg, OH (US)

( * ) Notice: Subject to any disclaimer, the term of this patent is extended or adjusted under 35 U.S.C. 154(b) by 418 days.

(21) Appl. No.: 11/848,634

(22) Filed: Aug. 31, 2007

(65) Prior Publication Data

US 2009/0063396 A1 Mar. 5, 2009

(51) Int. Cl.
*G06F 17/30* (2006.01)

(52) U.S. Cl. .................. 707/715; 707/746; 707/970

(58) Field of Classification Search .......... 707/1, 707/2, 3, 6, 10, 100, 101, 200, 715, 746, 707/970, 999.003, 999.101, 999.203
See application file for complete search history.

(56) References Cited

U.S. PATENT DOCUMENTS

| | | | |
|---|---|---|---|
| 5,551,027 A | 8/1996 | Choy et al. | |
| 5,960,194 A | 9/1999 | Choy et al. | |
| 6,795,821 B2 | 9/2004 | Yu | |
| 6,920,460 B1 | 7/2005 | Srinivasan et al. | |
| 7,124,071 B2 | 10/2006 | Rich et al. | |
| 7,447,681 B2 * | 11/2008 | Lightstone et al. | 707/999.003 |
| 2003/0055822 A1 | 3/2003 | Yu | |
| 2007/0294319 A1 * | 12/2007 | Mankad et al. | 707/204 |
| 2008/0120275 A1 * | 5/2008 | Cruanes et al. | 707/2 |
| 2008/0313246 A1 * | 12/2008 | Shankar et al. | 707/205 |
| 2009/0037365 A1 * | 2/2009 | Sinclair et al. | 707/2 |

* cited by examiner

*Primary Examiner*—Marc R Filipczyk
(74) *Attorney, Agent, or Firm*—Schwegman, Lundberg & Woessner, P.A

(57) ABSTRACT

Techniques for partitioning indexes are provided. A predefined data type associated with a column of a database table is acquired. Column value statistics for the column are acquired. The values are analyzed to produce multiple partitions for the values. Each partition includes each of the values and each partition includes multiple groupings of the values. Also, each grouping of a particular partition includes a subset or range of the values. Furthermore, each grouping of a partition includes a same distribution for the values as other groupings of that partition. Each partition represents a potential partitioning index for the column and its values.

14 Claims, 3 Drawing Sheets

TECHNIQUES FOR PARTITIONING INDEXES

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example source code as described below and in any drawings hereto: Copyright© 2007, NCR Corp. of Dayton, Ohio—All Rights Reserved.

FIELD

The invention relates generally to database processing and more particularly to techniques for partitioning indexes.

BACKGROUND

Enterprises are increasingly capturing, storing, and mining a plethora of information related to communications with their customers and related to their day-to-day internal operations. Often this information is stored and indexed within databases. Once the information is indexed, queries are developed on an as-needed basis to mine the information from the database for a variety of organizational goals, such as marketing, planning, reporting, etc.

In fact, the size of the databases can be daunting and each database can include many terabytes of information. To deal with this, an enterprise deploys a variety of hardware resources: storage devices, processing devices, network devices, etc. In addition, a variety of software resources are needed to optimally utilize the hardware resources associated with databases. Still further a plethora of expensive and skilled support and development staff is needed to maintain the databases and keep them operational.

One solution to address performance of the software resources is the efficient development of indexes of a database. A good index can significantly improve search response time, especially when the database is sufficiently large. Generally, large indexes are partitioned to improve the search performance of the database. The partitioning is done during the database design phase and remains largely unchanged after that point. Additionally, the complexity and size of the database can change significantly over time. Thus, in less a design for partitioning is well thought out and the database remains largely static, the conventional approaches are only marginally beneficial.

Furthermore, sometimes a column of a database table that was not originally partitioned becomes a good candidate for partitioning. Yet, existing techniques may not discover this situation for some time and in the interim the search performance of that column suffers.

Thus, improved mechanisms for partitioning indexes of a database are desirable.

SUMMARY

In various embodiments, techniques for partitioning indexes are presented. According to an embodiment, column value statistics for a column of a database table are mined and a minimum value and maximum value for values of the column are acquired. Next, partitions for the values within the minimum and maximum values are created in response to a distribution of the column value statistics and the minimum and maximum values. Each partition divides the values into groupings, and each grouping for a particular partition having an equal range of the values for that particular partition. Each partition is provided as a potential partitioning index for the distribution of the values associated with the column query statistics for a column of a database table.

DETAILED DESCRIPTION

Figure 1:
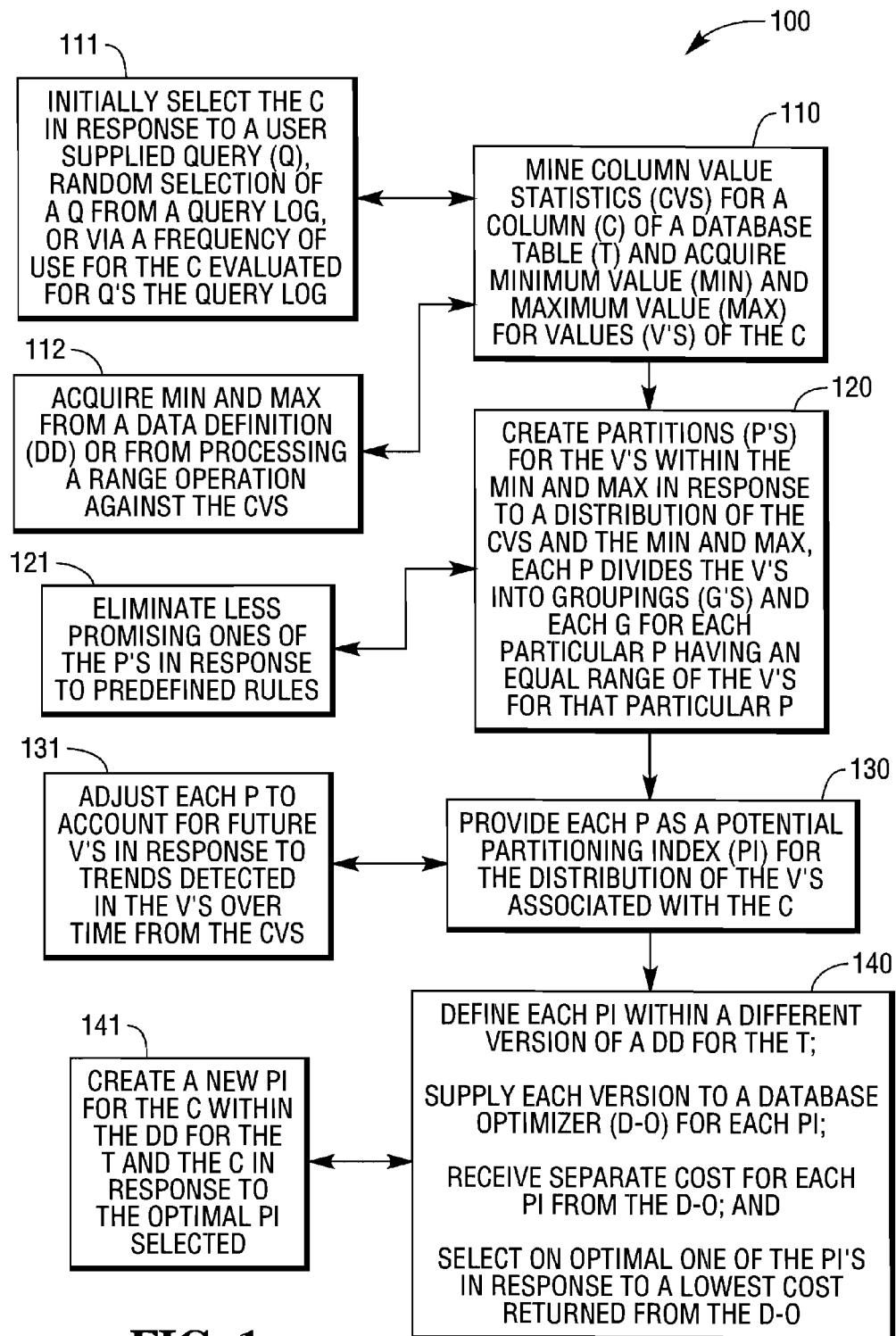
FIG. 1 is a diagram of a method for generating potential partitioning indexes for a column of a database table, according to an example embodiment.

FIG. 1 is a diagram of a method 100 for generating potential partitioning indexes for a column of a database table, according to an example embodiment. The method 100 (herein after referred to as "column partitioning index service") is implemented in machine-accessible or computer-readable media as instructions and is executed by one or more machines (processing devices). Moreover, the column partitioning index service is accessible over a network. The network may be wired, wireless, or a combination of wired and wireless.

As used herein a "database optimizer" (sometimes referred to as a "query optimizer") is used to develop query execution plans for queries that are to be executed against a database. Any database optimizer may be used. A "query execution plan" is a set of processing steps to perform a given query in an optimal manner against a given database. Queries are parsed by a database optimizer to produce the query execution plans. The database table definitions and existing indexes for columns of the table and statistics associated with the columns are used by the database optimizer in generating costs associated with each query execution plan produced. The costs can then be analyzed to develop improved queries, table definitions, and/or indexes.

The term "partitioning" refers to the physical ordering and layout of rows of a column. Each column of a database table includes multiple rows. Furthermore, each column may include a partitioned primary index (PPI) or may include a single non-PPI. A PPI is to be viewed as two or more indexes that are partitioned off of a primary index. So, in this sense a PPI is a plurality of indexes.

In a distributed database embodiment, each non PPI table of a particular database includes rows that are distributed to Access Module Processors (AMP's) via a hash of a primary index and physically ordered by the hash on each AMP. In a PPI solution, the rows continue to be distributed in the same fashion described above; however, on each AMP the rows are ordered first by partition number and then by the hash. The ordering by partition number is determined by a "partitioning expression," which a user or administrator specifies in a PARTITION_BY clause following a PRIMARY_INDEX clause in a SQL statement. The following is an example table defined via a PPI:

```
CREATE TABLE PPI_SalesHistory (
    product_code    CHAR(8),
    store_number    INTEGER,
    transaction_date DATE,
    quantity_sold   INTEGER,
    other_columns   CHAR(50))
PRIMARY INDEX (product_code, store_number, transaction_date)
    PARTITION BY RANGE_N(transaction_date BETWEEN
    DATE '2001-01-01' AND DATE '2004-12-31' EACH
    INTERVAL '1' MONTH);
            © 2007 NCR, Corporation, Dayton, Ohio
```

If a query has a WHERE condition on the partitioning expression column, it is often possible to skip one or more partitions during the table scan. The phrase "partition elimination" refers to a database optimizer's process of determining which partitions, if any, can be skipped. Although PPI's are potentially beneficial to a wide variety of queries, they are especially relevant for range queries. For example, they can be used in conjunction with queries that examine data within specified ranges or dates (e.g., to compare one period of sales to another period of sales, etc.).

In an embodiment, the database used with the techniques presented herein is a Teradata data warehouse product, distributed by NCR, Corporation of Dayton, Ohio.

It is within this initial context that the processing associated with the column partitioning index service is now discussed in detail.

The column partitioning index service may be implemented as a standalone service manually called or invoked by user or automatically and dynamically called or invoked by another automated service.

As one example implementation (discussed more completely below), a new SQL statement called "INITIATE PARTITION ANALYSIS." This works or is invoked for processing within a standard SQL query process engine and thus natural to invoke it via the SQL language. Hence the column partitioning index service is seamlessly integrated into the user interfaces within a relational database engine.

Alternatively, the column partitioning index service may be implemented as a sub function or service of a database optimizer. Moreover, any parameters supplied to the column partitioning index service may be done via a graphical user interface, file references, database fields, etc. Similarly, the potential partition indexes (discussed more completely below) may be supplied via a GUI to a user for viewing, selection, and subsequent use.

At 110, the column partitioning index service (after being invoked manually or automatically) mines column value statistics from a column of a database table for purposes of acquiring a minimum value and a maximum value for values of the column.

Again, statistics for columns of a database table are generally captured and retrievable from the database via a separate table. The statistics are run against the database tables at predefined intervals and are often used by database optimizers in determining costs for query execution plans that run against the tables.

According to an embodiment, at 111, the column partitioning index service may initially have identified the column for which the column value statistics are being mined in response to a variety of circumstances. For example, a user may have supplied a query (user-supplied query) that actually identifies the column in question within a SQL WHERE clause.

According to an embodiment, the column is identified by evaluating a set of workload queries for WHERE clauses that use a range condition. These types of WHERE clauses often embedded in SQL queries are particularly useful in identifying a column that may be ripe for a partition index. For example a SQL statement "WHERE store_number BETWEEN 5 and 25" is a WHERE clause for a column of "store_number" and includes a range condition "BETWEEN 5 and 25;" this provides an automated analysis for identifying a column that can benefit from a partition index. However, it is to be understood that the techniques presented herein do not have to rely on constants appearing in condition statements of SQL WHERE clauses. This is by one example technique that may be used and as discussed more completely below there are other techniques as well.

In fact, a set of queries defined as a workload can be used to identify columns and in some cases initial partitions may also be disclosed within range conditions associated with the WHERE clause. For example, a SQL WHERE clause may appear as follows: "WHERE quantity BETWEEN 1500 and 3000." In this example, the WHERE clause identifies the column "quantity" and also supplies an initial potential index partition of 1500 (3000−1500=1500). So, the WHERE clause can assist in automatically identifying the column and a potential partition or range of values within the column for indexing. Sets of queries can be examined as workloads (discussed below). The initial proposed partition of 1500 can be subsequently modified by evaluation of the statistics (discussed below) and heuristics or rules (discussed below).

It is also to be understood that multiple columns and their potential partition indexes can be evaluated at one time together by examination of the workload query set and their SQL WHERE clauses.

In another case, the query to examine may be randomly selected or selected via some predefined rule or policy from a query execution log for the database table associated with the column. Still further, the column may be identified by evaluating a frequency of use for the chosen column vis-à-vis other columns included in historical queries; the queries evaluated from the query execution log for the database table. Moreover, although the examples presented discuss producing a partition index or a set of potential partition indexes for a single column, the invention is not to be so limited; as the column partitioning index service can simultaneously evaluate one or more queries and produce potential partitioning indexes for each detected column of the queries. In fact, an example that uses this approach is discussed more completely below.

In an embodiment, the minimum and maximum value for the column values is acquired from a data definition associated with the database table's column or acquired from processing a range operation against the column value statistics. Again, an example the range operation usage is presented below.

At 120, the column partitioning index service creates partitions for the values within the minimum and maximum values in response to a distribution (such as a histogram) of the column value statistics and the determined minimum and maximum values.

Each partition divides the values into groupings. Each grouping for any particular partition has an equal range of the values for that particular partition. In other words, a partition covers all the values from the minimum value to the maximum value by having multiple groupings of the values and each grouping is of an equal width or covers an equal range of the values. For example, suppose the values for a given column are months of a year, such that the minimum value is January and the maximum value is December. One partition may include 12 groupings, and each grouping representing a particular month. Another partition may include 3 groupings, each grouping including 4 months (a fiscal quarter for an enterprise). Other examples of this are illustrated below.

According to one aspect of the teachings, at 121, the column partitioning index service eliminates some of less promising ones of the partitions from consideration entirely in response to predefined rules. This is done in an effort to reduce resources (e.g., processor, memory, software services, etc.) and time required or needed to search a solution space for candidate or potential partitions. That is, the potential partitions can be infinite so the rules help eliminate some possibilities for the start.

Some example rules used to reduce the solution space to a list of workable partitions can include the following:

1. Partitioning expressions defined on the column using the RANGE_N function whose test-value column is of type DATE or integer.
2. Partitioning expressions whose chosen column appears in one or more equality or range conditions of workload queries.
3. Partitioning expressions whose defined RANGE_N function specifies a single overall range along with a specified range-size (EACH clause) that further divides it into ranges of equal size.
4. Partitioning expressions whose defined range-start and range-end values are based on the minimum and maximum values stored in the partitioning column's value statistics. In the case of DATE columns, the range-end will be further increased to leave approximately 10% of the partitions empty for future expansion.
5. Partitioning expressions whose granularity (range-size) has been evaluated along with other potential granularities and chosen for its ability to maximize partition elimination (and minimize workload costs). Coarser granularities are favored over finer ones when costs are similar.

Partitioning with a SQL RANGE_N function or operation on a single column generally offers the most opportunities for optimization. Use of this function allows the database optimizer to calculate a total number of partitions and the partition elimination can occur with a variety of query conditions including equality and range conditions. In addition, RANGE_N is especially useful with columns that store dates.

For the given column being analyzed for partitions, the search and selection process to create and derive those partitions can be summarized as finding a best or optimal level of granularity for that column's data domain (values) and applicable query predicates. In an embodiment, the following heuristics can be used to control the various levels of granularity that the column partitioning index service considers in this process:

1. The coarsest level of granularity to be considered is one that produces no fewer than 4 partitions. It is assumed that anything less than 4 partitions rarely results in significant query cost performance via partition elimination. The calculated <range-size> for this level of granularity can be calculated as (MaxVal−MinVal)/4; where MaxVal stands for maximum value and MinVal stands for minimum value.
2. The finest level of granularity to be considered for DATE columns is 1 'day' and for integer columns is the value 1. The finest level of granularity that is considered is further restricted to those levels where the resulting number of partitions is less than 65535 (assuming this to be a system limit).
3. The list of potential <range-size> values for DATE columns are taken from a fixed list consisting of: 2 years, 1 year, 6 months, 1 month, 7 days (1 week), and 1 day. It is assumed that these levels represent the most natural and efficient granularities for DATE related data. Additional levels can easily be added to this list, if deemed useful by a database administrator.
4. The list of potential <range-size> values for integer columns includes the previously mentioned coarsest level of (MaxVal−MinVal)/4 along with the set of successively finer levels whose granularity is increased by a factor of 2: ((MaxVal−MinVal)/8), ((MaxVal−MinVal)/16), etc.

Finally, the approach taken for identifying promising partitioning of a column does not rely heavily on the presence of constants in a particular query. Instead, in an embodiment, the column partitioning index service looks for DATE and integer columns that appear in range or explicit terms with or without constants. Once the column partitioning index service identifies these columns, it then considers partitioning expressions whose overall range boundaries are determined by the collected column value statistics (min and max val). It then considers various levels of granularity (EACH clause) based on the data type and statistics. No attempt is made to "hard-wire" the partitioning expressions to match search constants specified in WHERE conditions. It is assumed that constants appearing in queries tend to fluctuate, especially for DATE columns which by their very nature change over time. This approach recommends general purpose partitioning of expressions, rather than an approach geared specifically for one set of query constants.

Although it is noted, the column partitioning index service can be tailored to a specific set of query constants if this is desirable in a given database environment.

At 130, the column partitioning index service has determined and filtered the partitions, such that each remaining partition identified by the column partitioning index service is now provided as a potential partitioning index for the distribution of the values associated with the column being analyzed or processed.

In an embodiment, at 131, the column partitioning index service may also adjust each of the partitions to account for future values in response to trends detected in the values over time from the column value statistics or in response to predefined rules or heuristics. An example of this was presented above where 10% of the partitions were intentionally left empty for future or planned expansion.

The list of potential partitioning indexes can in themselves be supplied or presented to a user or a database administrator for them to specifically select a desired one of the partitioning indexes. Thus, the column partitioning index service may be complete in its processing once the list of potential partitioning indexes are produced and it can be left up to other processes or services to decide on what to do with them.

Alternatively, at 140, the column partitioning index service may automatically interact with a database optimizer to specifically select one of the partitioning indexes as an optimal partitioning index for the column being analyzed. This can be done by defining each partitioning index within a different version of a data definition for the database table associated with the column. Next, each different version of the data definition is supplied to the database optimizer. The column partitioning index service then receives from the database optimizer costs for each different partitioning index and selects a lowest cost as being associated with an optimal partitioning index.

This optimally determined partitioning index can then be supplied to a user or administrator or even another automated service or process for these entities to do as they please.

However, in some cases, at 141, the column partitioning index service may take it a step further by automatically interacting with other services to create a new partitioning index for the column within the existing data definition for the database table. In this manner, the database table and the column can immediately, dynamically, and automatically begin benefiting from the optimally determined partitioning index that is represented as the new partitioning index.

It is now appreciated how partitioning of indexes for columns of a database table can be achieved in an automated, dynamic, and real time fashion. This is a substantial improvement over what has occurred in the past where such partitioning were largely determined via manual analysis and during the design stage of a database table.

An example illustration of how the column partitioning index service may process a specific database table having multiple columns is now provided for purposes of comprehension of the techniques presented herein. This example is not intended to limit the teachings presented herein.

EXAMPLE

Solution Space of Potential Partition Indexes

The following example shows the solution space for a representative workload and demonstrates how the above described processing and heuristics focus the search and selection process on promising candidate or potential partitioning indexes for two columns. The example assumes the existence of user tables whose table definitions are shown below. The SalesHistory table has 4 years of transaction data within the period 2002 to 2005 and has associated stores whose identifiers (codes) are in the range 1 to 100.

```
CREATE TABLE SalesHistory (
  product_code    CHAR(8),
  store_number    INTEGER,
  transaction_date DATE,
  quantity_sold   INTEGER,
  other_columns CHAR(50))
PRIMARY INDEX (product_code, store_number, transaction_date);
CREATE TABLE Products(
  product_code    CHAR(8),
  description     VARCHAR(50)
  product_category CHAR(10),
  price           DECIMAL(10,2),
  quantity_avail  INTEGER)
PRIMARY INDEX (product_code);
     © 2007 NCR Corporation, Dayton, Ohio
```

This example assumes a workload named "SalesWorkload" which is defined with the following 2 queries.

```
Query #1:    SELECT store_number, SUM(quantity_sold)
   FROM SalesHistory
   WHERE store_number BETWEEN 5 and 10
   GROUP BY store_number;
Query #2:    SELECT product_category, SUM(quantity_sold)
   FROM SalesHistory s, Products s
   WHERE s.product_code = p.product_code AND
              transaction_date BETWEEN (DATE '2005-12-01' AND
DATE '2005-12-31')
   GROUP BY product_category;
© 2007 NCR Corporation, Dayton, Ohio
```

It is assumed that the workload definition process has collected statistics on the following columns:

```
SalesHistory.store_number
   Min_value: 1
   Max_value: 100
SalesHistory.transaction_date:
   Min_value: '2002-01-01'
   Max_value: '2005-12-31'
   © 2007 NCR Corporation, Dayton, Ohio
```

A Partition Analysis is being performed on table SalesHistory with the following statement:
INITIATE PARTITION ANALYSIS ON SalesHistory FOR SalesWorkload
   IN MyQCD AS MyPPIRecs;
   © 2007 NCR Corporation, Dayton, Ohio In this particular example, table Products is not being analyzed. However, it is possible to analyze all tables referenced in a workload or any given subset.

In a generic case, the following SQL statement will analyze a specified workload and make recommendations regarding Partitioned Primary Indexes (PPI's):

```
INITIATE PARTITION ANALYSIS ON <table_list>
   FOR <workload> IN <query_capture_database>
         © 2007 NCR Corporation, Dayton, Ohio
```

Here, <workload> is a name previously associated with one or more SQL queries. The result of this statement is a set of recommended PPI definitions on the tables specified in the <table_list>. The recommendations are stored within a named set of predefined dictionary tables that is identified by <query_capture_database>.

Continuing with the example now; given below is the list of candidates that make up the solution space:

```
candidate #1:   PARTITION BY RANGE_N(transaction_date
         BETWEEN DATE '2002-01-01' AND DATE '2005-12-31' EACH
         INTERVAL '1' YEAR);
candidate #2:   PARTITION BY RANGE_N(transaction_date
         BETWEEN DATE '2002-01-01' AND DATE '2005-12-31' EACH
         INTERVAL '6' MONTH);
candidate #3:   PARTITION BY RANGE_N(transaction_date
         BETWEEN DATE '2002-01-01' AND DATE '2005-12-31' EACH
         INTERVAL '1' MONTH);
candidate #4:   PARTITION BY RANGE_N(transaction_date
         BETWEEN DATE '2002-01-01' AND DATE '2005-12-31' EACH
         INTERVAL '7' DAY);
candidate #5:   PARTITION BY RANGE_N(transaction_date
         BETWEEN DATE '2002-01-01' AND DATE '2005-12-31' EACH
         INTERVAL '1' DAY);
candidate #6:   PARTITION BY RANGE_N(store_number BETWEEN
         DATE 1 AND 100 EACH 25);
candidate #7:   PARTITION BY RANGE_N(store_number BETWEEN
         DATE 1 AND 100 EACH 12);
candidate #8:   PARTITION BY RANGE_N(store_number BETWEEN
         DATE 1 AND 100 EACH 6);
candidate #9:   PARTITION BY RANGE_N(store_number BETWEEN
         DATE 1 AND 100 EACH 3);
candidate #10:  PARTITION BY RANGE_N(store_number
         BETWEEN DATE 1 AND 100 EACH 1);
         © 2007 NCR Corporation, Dayton, Ohio
```

In this example, the coarsest granularity for transaction_date is calculated as 4 years/4=1 year and for store_number it is calculated as 100/4=25. For the sake of simplicity, the example above does not demonstrate the technique of defining empty partitions to leave room for future expansion.

A Search Engine component will perform a combinatorial search on the set of all possible partition index candidates where a given set has at most one candidate partition index per table. By rule, a table can be defined with at most one partition index. For small workloads, the search is exhaustive but for larger workloads a random search is employed. In the example above, only a single table is being analyzed so each candidate set consists of one candidate partition expression.

For a given candidate set, an Index Simulator component is called to fake the existence of each partitioning expression within the data dictionary and table header. The definitions of other existing indexes on the table are left intact. The database optimizer is then called to generate the optimal execution plan for each query along with its estimated cost. Any partition elimination that occurs in each plan using a candidate partition index is noted and the partition index is marked as used. The final chosen candidate set is the one that minimizes the total (summed) cost of all queries in the workload. The final recommendations are then formed using the marked/used candidates within this set.

Given the fact that query #2 has a WHERE condition on 'SalesHistory' that limits the requested data to a period of one month, it is assumed the optimal level of granularity for 'transaction_date' is "EACH '1' MONTH". Similarly, query #1 has a WHERE condition on SalesHistory that limits the requested data to store numbers in the range 5 to 10, so the optimal level of granularity will be "EACH 6".

Figure 2:
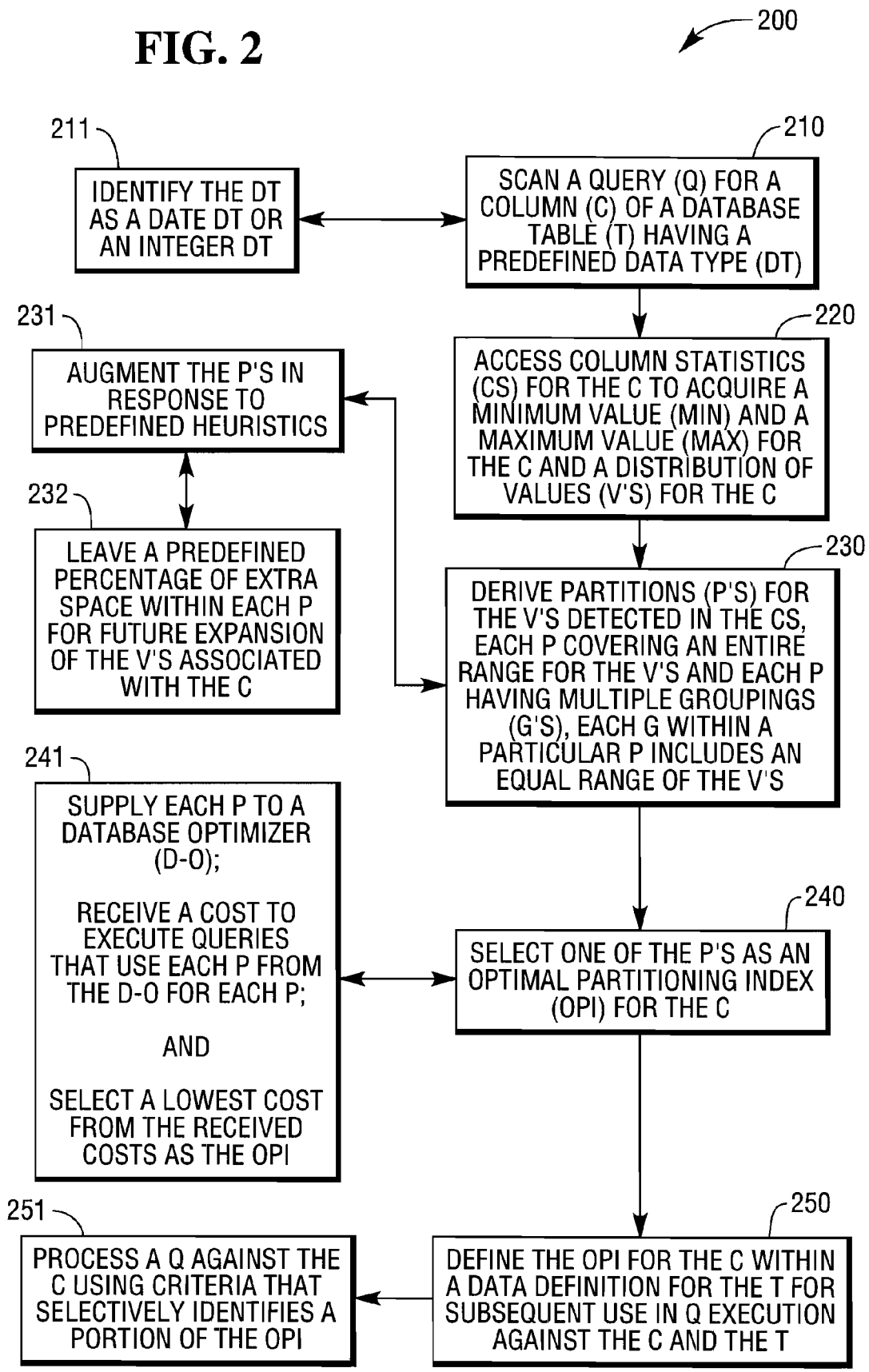
FIG. 2 is a diagram of a method for deriving a partitioning index for a column of a database table, according to an example embodiment.

FIG. 2 is a diagram of a method 200 for deriving a partitioning index for a column of a database table, according to an example embodiment. The method 200 (hereinafter referred to as "partitioning index selection service") is implemented in a machine-accessible and readable medium as instructions that when executed by a machine performs the processing depicted in FIG. 2. Moreover, partitioning index selection service is operational over a network, which may be wired, wireless, or a combination of wired and wireless.

The partitioning index selection service presents an enhanced and more detailed perspective of column partitioning index service, which was presented with respect to the method 100 of the FIG. 1. The details of this enhanced processing is discussed more completely below.

At 210, the partitioning index selection service scans one or more queries for a column of a database table. The column has a predefined data type that the partitioning index selection service is looking for. In an embodiment, the data type may be predefined and identified by the partitioning index selection service as a date data type or an integer data type.

According to an embodiment, the partitioning index selection service identifies the column in question by parsing the query for a SQL WHERE clause and identifying one or more potential columns. Specifically, WHERE clauses with range conditions, discussed above with reference to the method 100 of the FIG. 1. If the potential columns are of the predefined data type, then the column is selected as the column to process for purposes of producing an optimal partitioning index for that column.

At 220, the partitioning index selection service access column statistics for the column for purposes of acquiring a minimum value and a maximum values The partitioning index selection service also acquires a distribution of values for the column from the column statistics. As was mentioned above with reference to the method 100 of the FIG. 1, the column statistics can be produced for a database on a periodically configured basis and used by a database optimizer when determining costs for query execution plans that process against the database. Moreover, in some cases the column statistics may be represented in a histogram to depict or represent the distribution of values for the column.

At 230, the partitioning index selection service derives partitions for the values detected in the column statistics. A specific technique for achieving this was discussed above with reference to the method 100 of the FIG. 1; an example illustration of achieving this was also provided with the discussion of the FIG. 1 above.

Each partition covers an entire range of the values for the column as identified in the distribution and with the minimum and maximum values. Further, each partition includes multiple groupings. Each grouping within any particular partition includes an equal range of the values. In other words all of the groupings for a particular partition together span all the values for the column and any particular grouping has a same width or range of values as the remaining groupings for that particular partition. Examples of this were provided above with reference to the method 100 and the FIG. 1.

According to an embodiment, at 231, the partitioning index selection service augments each of the partitions in response to predefined heuristics or rules. An example of this is partition elimination to reduce the size of the solution space when determining available partitions. Again, specific scenarios and heuristics for doing this were discussed in detail above with reference to the method 100 of the FIG. 1.

Similarly, at 232, the partitioning index selection service may augment the partitions by leaving a predefined percentage of extra space within each partition or space for extra partitions. This can be done to account for future expansion of the values associated with the column. Examples of this were also presented above with reference to the method 100 of the FIG. 1.

At 240, the partitioning index selection service selects one of the partitions as an optimal partitioning index to be used with the column and its database table.

One way to select an optimal partitioning index is to have a user or administrator supply the selection of the optimal partitioning index after the partitioning index selection service presents candidate or potential partitions to the user or administrator.

Another way to select the optimal partition index is depicted at 241. Here, the partitioning index selection service automatically and dynamically interacts with a database optimizer and supplies each partition to the database optimizer. This can be done in the manner discussed above with reference to the method 100 of the FIG. 1, where a data definition is altered before a request is submitted to the database optimizer; so, the database optimizer assumes the partition in question is already defined in the data definition for the database table of the column. The partitioning index selection service then receives costs associated with executing queries that use each partition. Next, the partitioning index selection service selects the optimal partitioning index as the lowest cost partition returned from the database optimizer. This approach is entirely automatic and provides a mechanism for selecting and resolving an optimal partitioning index.

In an embodiment, at 250, the partitioning index selection service may be configured to automatically implement the optimal partitioning index for the column within its data definition of the database table to which it relates. This can be done by defining the optimal partitioning index for the column within the data definition for the database table. At 251, subsequent queries execute against the column using criteria that selectively identifies a portion of the optimal partitioning index. Sample calls and usage of this was presented above with the discussion of the FIG. 1.

Figure 3:
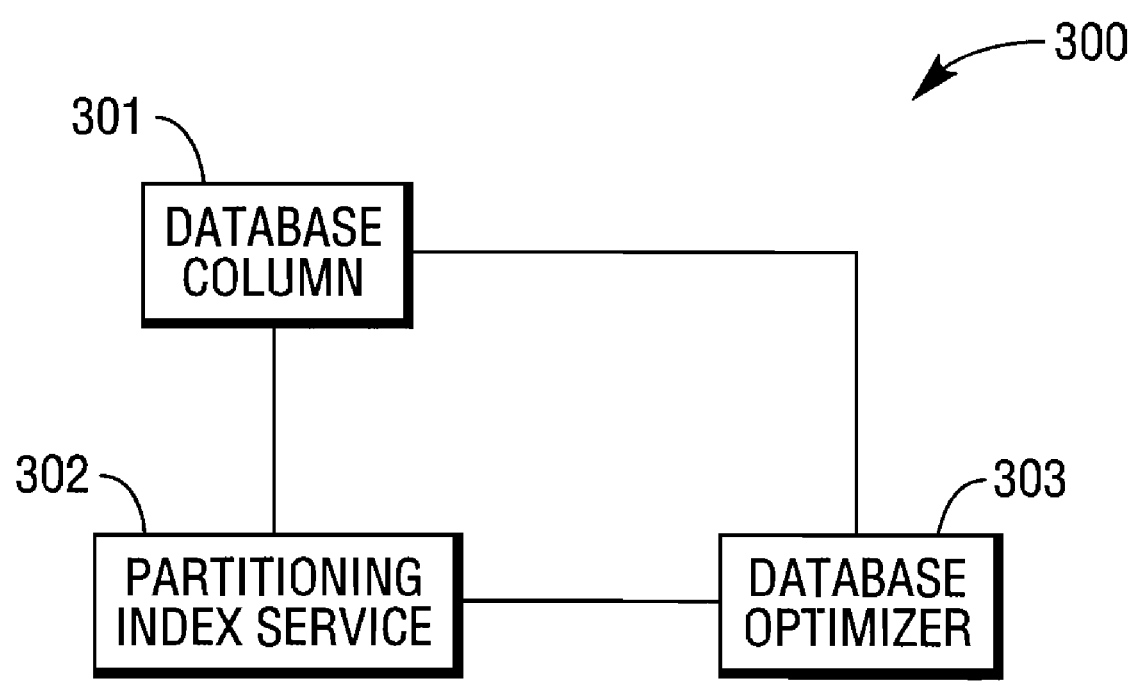
FIG. 3 is a diagram of a column partitioning index system, according to an example embodiment.

FIG. 3 is a diagram of a column partitioning index system 300, according to an example embodiment. The column partitioning index system 300 is implemented in a machine-accessible and readable medium as instructions that when executed by a machine performs a variety of processing, such as the processing discussed in detail above with reference to the methods 100 and 200 of the FIGS. 1 and 2.

The column partitioning index system 300 includes a database table column 301 and a partitioning service 302. In an embodiment, the query scoring and comparison system 300 also includes a database optimizer service 303. Each of these and their interactions with one another will now be discussed in detail.

The column 301 is implemented within a database in a machine-accessible and readable medium and is processed by services that execute on a machine. In an embodiment, the column 301 is of a predefined data type, such as a date data type or an integer. In some cases, if proper heuristics are defined the predefined data type may be other types such as but not limited to text, user-defined, real numbers, etc.

The partitioning service 302 is implemented in a machine-accessible and readable medium as instructions that process on the machine or a different machine of the network. Example processing associated with the partitioning service 302 was presented above in detail with reference to the methods 100 and 200 of the FIGS. 1 and 2, respectively.

The partitioning service 302 automatically and dynamically selects or determines the column 301 from a database table of a database. One technique for doing this is to scan a query or a set of queries identified as a workload and look for SQL where clauses having range conditions. This was discussed in detail above with reference to the methods 100 and 200 of the FIGS. 1 and 2, respectively.

In another embodiment, the partitioning service 302 is manually supplied the column by a database administrator or other user via a graphical user interface (GUI).

The partitioning service 302 automatically and dynamically selects or determines the column 301 in a number of manners. For example, the partitioning service 302 can scan a query, set of queries, or log of queries looking for SQL statements that identify columns (such as WHERE clauses with range conditions) and then determining if the identified columns conform to the predefined data type. The query or queries can be supplied by a user or administrator. Alternatively, a query execution log can be analyzed and rules or heuristics used for resolving the column, such as a frequency of use heuristic, etc.

The partitioning service 302 also dynamically and automatically acquires and processes column values from statistics associated with the database table for purposes of deriving an optimal partitioning index or set of candidate partitioning indexes for the column. Once the optimal partitioning index is implemented and defined within a data definition for the database table of the column, each subsequently executed query against the column can selectively identify a portion of the optimal partitioning index within the syntax of that query.

The partitioning service 302 first resolves or identifies a minimum value and maximum value for the column values. One technique for doing this is to use a RANGE operation associated with the predefined data type of the column against the column values. Next, the partitioning service 302 acquires a distribution (such as a histogram, etc.) for the column values and then begins to identify candidate partitions to be considered for the optimal partitioning index.

Also, the partitioning service 302 can enforce predefined heuristics or rules when deriving the optimal partitioning index. These heuristics may be resolved or identified in response to the predefined data type of the column and can assist the partitioning service 302 in eliminating some potential partitions from the solution space of available partitions to consider for the optimal partitioning index.

The partitioning service 302 can also pad each grouping of the values identified within the optimal partitioning index to account for future growth of the values associated with the column. Moreover, additional groupings that are initially empty may be generated to account for future growth within the optimal partitioning index.

Techniques for presenting candidate partitioning indexes and automatically and dynamically resolving the optimal partitioning index was presented in detail and by way of an example illustration above with reference to the method 100 of the FIG. 1. One technique is to interact and utilize a database optimizer service 303.

In an embodiment, the column partitioning index system 300 also includes a database optimizer service 303. The database optimizer 303 is implemented in a machine-accessible and readable medium as instructions that process on the machine or a different machine of the network.

The database optimizer 303 assists the partitioning service 302 in automatically and dynamically determining, resolving, and identifying the optimal partitioning index by supplying costs for potential or candidate partitioning indexes of the values to the partitioning service 302. A lowest cost returned by the database optimizer 303 for a particular potential partitioning index (particular candidate partition) is identified by the partitioning service 302 as being the optimal partitioning index.

Conventionally, physical database design processes for defining partitioning expressions of indexes are in the form of written guidelines published in user manuals or education material. Yet, there are no existing tools that use a sophisticated automatic and cost based approach to accurately recommend partitioning indexes.

Design tools that rely exclusively on rules and heuristics to recommend partitioning expressions are much less effective than the cost based solution described above. Such solutions consider far fewer candidates and their method for ranking alternative candidates is less accurate. In many respects, prior solutions do nothing more than marginally automate existing manual processes.

Furthermore, any design tools that may attempt to blindly search and cost an entire solution space of candidate partitioning expressions are not feasible.

The techniques presented herein are an intelligent blend of workload analysis heuristics and cost based automated search techniques, which completely solve the prior problems and infeasible approaches of convention techniques. The approach discussed herein allows a design tool to explore a large (and yet manageable) number of candidate solutions and provides an accurate mechanism for costing and ranking the candidates by calling a database or query optimizer.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A computer-implemented method, comprising:
   mining column value statistics for a column of a database table and acquiring a minimum value and a maximum value for values of the column, the column value statistics are retrieved via a separate table from the database table associated with the column and acquired at predefined intervals and the column value statistics used by a database optimizer in determining costs for query execution plans that run against the database table;
   creating partitions for the values within the minimum and maximum values in response to a distribution of the column value statistics and the minimum and maximum values, wherein each partition divides the values into groupings, and each grouping for a particular partition having an equal range of the values for that particular partition; and
   providing a particular partition as an optimal partitioning index for the distribution of the values associated with the column.

2. The method of claim 1 further comprising:
   defining each potential partitioning index within a different version of a data definition for the database table;
   supplying each version of the data definition to the database optimizer for each potential partitioning index;
   receiving a separate cost for each of the potential partitioning indexes from the database optimizer in response to each submitted version of the data definition; and
   selecting an optimal one of the potential partitioning indexes in response to a lowest one of the costs returned from the database optimizer.

3. The method of claim 2 further comprising, creating a new partitioning index for the column within the data definition for the database table and the column in response to the optimal potential partitioning index selected.

4. The method of claim 1 further comprising, adjusting each partition to account for future values associated with the column in response to trends detected in the values of the column over time from the column value statistics or in response to a predefined policy.

5. The method of claim 1, wherein mining further includes acquiring the minimum and maximum values from a data definition associated with the database table or from processing a SQL RANGE N operation against the column value statistics.

6. The method of claim 1 further comprising, initially selecting the column from the database table in response to one or more of the following: a user supplied query that identifies the column in a SQL WHERE clause of that user supplied query, in response to random selection of a query and its use of the column obtained from a query execution log for the database table, and in response to a frequency of use of the column as identified from historical queries evaluated from the query execution log for the database table.

7. The method of claim 1, wherein creating further includes eliminating less promising ones of the partitions in response to predefined rules in an effort to reduce resources and time used to search a solution space for the partitions.

8. A computer-implemented method, comprising:
   scanning a query for a column of a database table having a predefined data type;
   mining column statistics for the column to acquire a minimum value and a maximum value for the column and to acquire a distribution of values for that column, the column statistics are retrieved via a separate table from the database table associated with the column and acquired at predefined intervals and the column statistics used by a database optimizer in determining costs for query execution plans that run against the database table;
   deriving partitions for the values detected in the column statistics, each partition covering an entire range of the values and each partition having multiple groupings, wherein each grouping within a particular partition includes an equal range of the values; and
   selecting one of the partitions as an optimal partitioning index for the column.

9. The method of claim 8 further comprising, defining the optimal partitioning index for the column within a data definition for the database table for subsequent use in query execution against the column and the database table.

10. The method of claim 9 further comprising, processing a query against the column using criteria that selectively identifies a portion of the optimal partitioning index.

11. The method of claim 8, wherein scanning further includes identifying the predefined data type as being a date data type or an integer data type.

12. The method of claim 8, wherein deriving further includes augmenting the partitions in response to predefined heuristics.

13. The method of claim 12, wherein deriving further includes leaving a predefined percentage of extra space within each partition for future expansion of the values associated with the column.

14. The method of claim 8, wherein selecting further includes:
   supplying each partition to the database optimizer;
   receiving a cost to execute queries that use each partition from the database optimizer for each partition; and
   selecting a lowest cost from the received costs as the optimal partitioning index for the column.

* * * * *